United States Patent [19]

Okibayashi et al.

[11] Patent Number: 5,504,599
[45] Date of Patent: Apr. 2, 1996

[54] LIQUID CRYSTAL DISPLAY DEVICE HAVING AN EL LIGHT SOURCE IN A NON-DISPLAY REGION OR A REGION BESIDES A DISPLAY PICTURE ELEMENT

[75] Inventors: Katsushi Okibayashi, Sakurai; Kousuke Terada, Tenri; Akiyoshi Mikami, Mie; Hiroyuki Shimoyama, Nara, all of Japan

[73] Assignee: Sharp Kabushiki Kaisha, Osaka, Japan

[21] Appl. No.: 136,418

[22] Filed: Oct. 15, 1993

[30] Foreign Application Priority Data

Nov. 26, 1992 [JP] Japan .................................. 4-317488

[51] Int. Cl.⁶ .................. G02F 1/1335; G02F 1/1333
[52] U.S. Cl. .................................. 359/50; 359/48; 359/79
[58] Field of Search .......................... 359/50, 48, 49, 359/68, 79; 315/169.3

[56] References Cited

U.S. PATENT DOCUMENTS

| 4,347,265 | 8/1992 | Washo | 427/108 |
|---|---|---|---|
| 4,580,877 | 4/1986 | Washo | 359/48 |
| 4,772,885 | 9/1988 | Uehara et al. | 359/50 |
| 4,877,995 | 10/1989 | Thioulouse | 315/169.3 |
| 4,929,060 | 5/1990 | Sugimoto et al. | 359/68 |
| 5,101,289 | 3/1992 | Takao et al. | 359/68 |
| 5,280,221 | 1/1994 | Okamoto et al. | 315/169.3 |
| 5,300,928 | 4/1994 | Yamazaki | 359/48 |

FOREIGN PATENT DOCUMENTS 50-19215  7/1975  Japan .
1-164473  11/1989  Japan .

Primary Examiner—Anita Pellman Gross
Assistant Examiner—Toan Ton
Attorney, Agent, or Firm—Nixon & Vanderhye

[57] ABSTRACT

To reduce the thickness of liquid crystal display device and enhance its performance by integrating the liquid crystal display element and light source. One surface of a substrate and one surface of a substrate are adhered with an adhesive layer through an intervening liquid crystal layer. On the other surface of the substrate, an EL light source is mounted, that is, a glass substrate on which a first electrode, a first insulation layer, a phosphor layer, a second insulation layer, and a second electrode are laminated in this sequence is bonded with an insulation layer. Therefore, the liquid crystal display device may be reduced in thickness and enhanced in performance.

12 Claims, 9 Drawing Sheets

Fig. 3 (1)
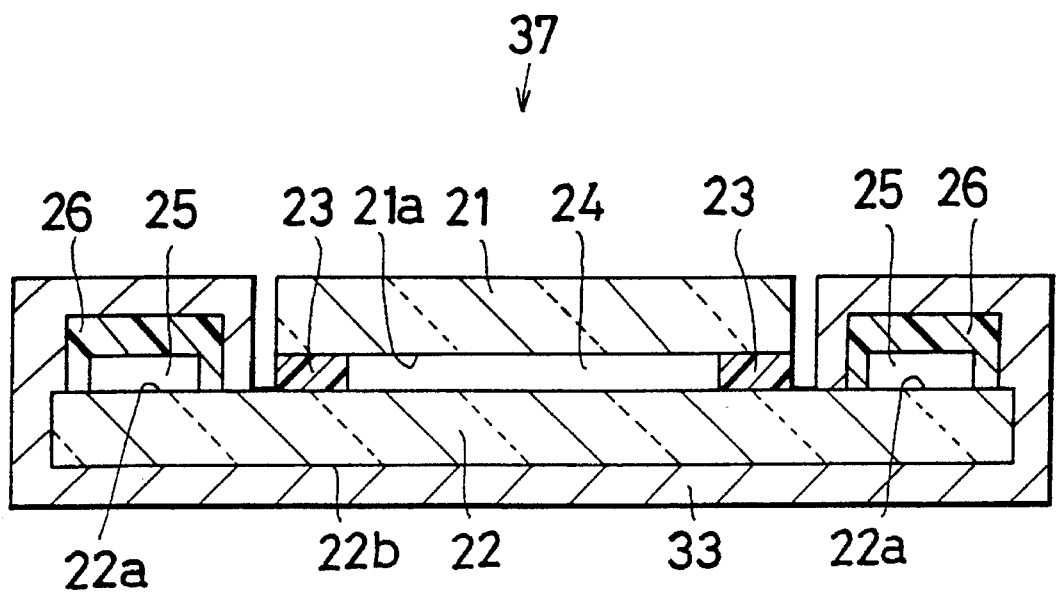
Fig. 3 (2)
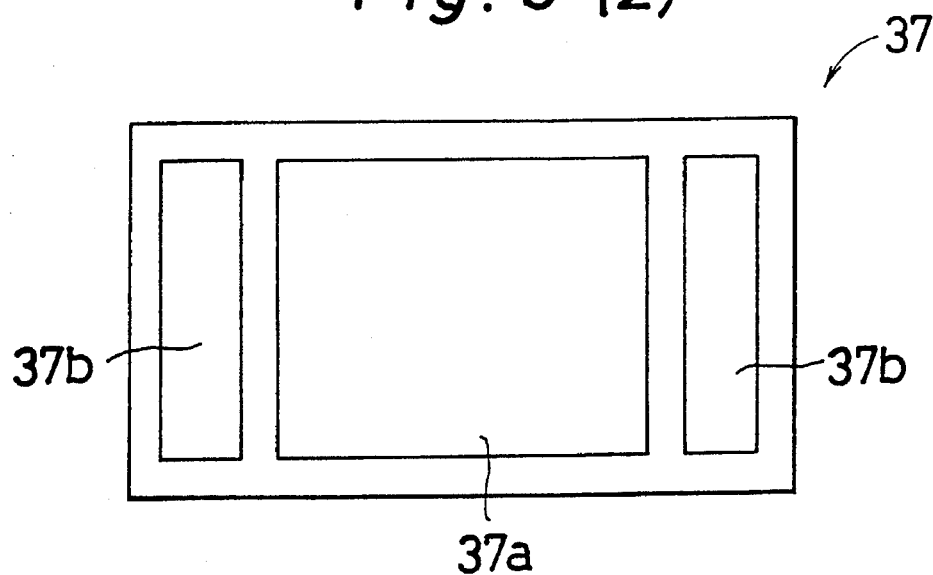

Fig. 7
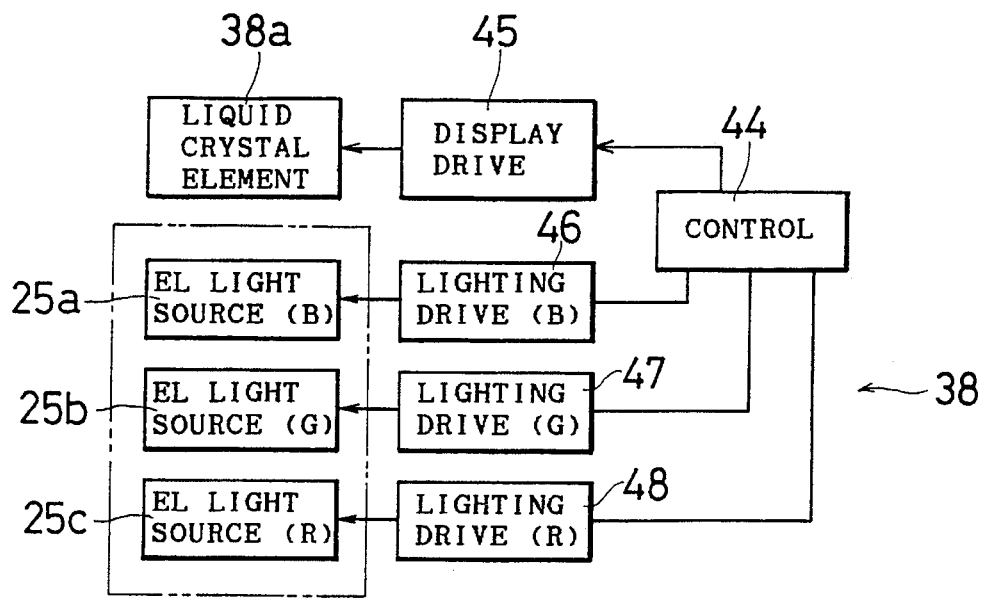
Fig.8(1) LIQUID CRYSTAL DISPLAY ELEMENT 
Fig.8(2) EL LIGHT SOURCE (B) 
Fig.8(3) EL LIGHT SOURCE (G) 
Fig.8(4) EL LIGHT SOURCE (R) 

Fig. 9 (1)
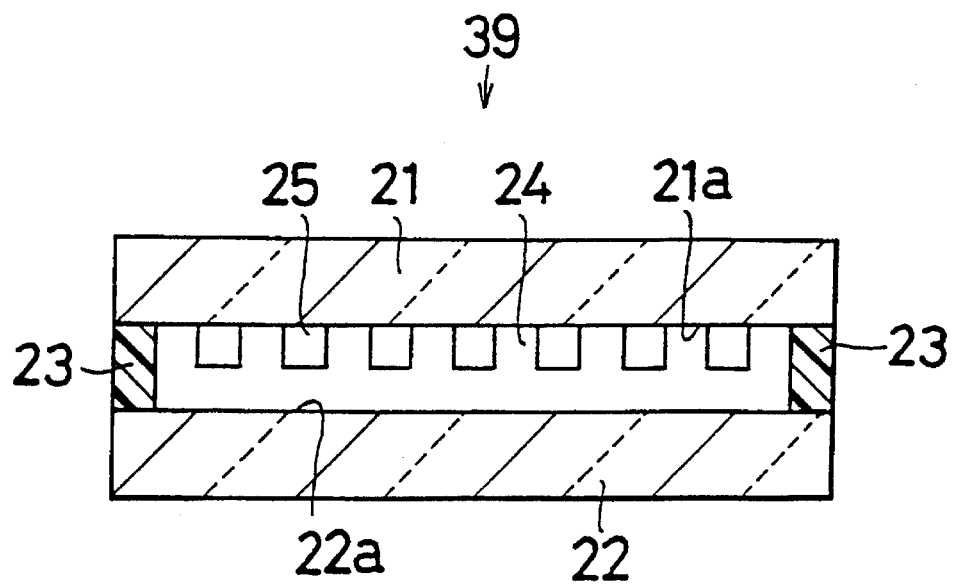
Fig. 9 (2)
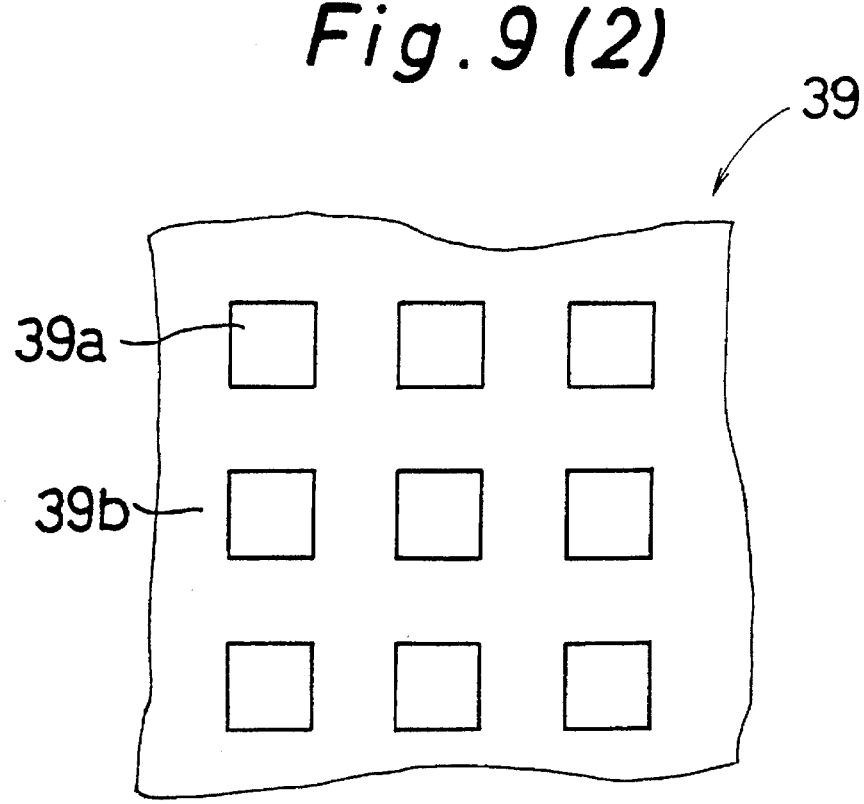

5,504,599

LIQUID CRYSTAL DISPLAY DEVICE HAVING AN EL LIGHT SOURCE IN A NON-DISPLAY REGION OR A REGION BESIDES A DISPLAY PICTURE ELEMENT

BACKGROUND OF THE INVENTION

1. Field of the Invention

The present invention relates to a liquid crystal display device, and more particularly to a liquid crystal display device using a light emitting element, particularly a thin film electroluminescent (EL) element, as the light source.

2. Description of the Related Art

The liquid crystal display device is an apparatus for displaying by controlling the orientation state of liquid crystal molecules, and is usually provided with a back light in order to improve the visual recognition and enable use in a dark place. In the conventional liquid display device, the back light was generally composed as follows.

(a) A plurality of cold cathode ray tubes arranged linearly and with a diffusion film disposed immediately beneath the liquid crystal element.

(b) Cold cathode ray tube is disposed at one end of a resin plate for leading light.

(c) The so-called dispersion type EL element having a resin film diffused fluorescent material enclosed by electrodes is disposed immediately beneath the liquid crystal element.

FIG. 12 is a sectional view showing a constitution of a liquid crystal display device 1 using the back light of (b) above. The liquid crystal display device 1 comprises a liquid crystal element part 6 including a liquid crystal 5 between a pair of light permeable substrates 2, 3, and sealing the substrates 2, 3 with a sealing agent 4, and a back light part 10 containing a light source 8, a light conducting plate 7 and a reflector 9. At the side of one substrate 3 of the liquid crystal element part 6, the light conducting plate 7 is disposed, and at the side of one end 7a of the light conducting plate 7, the light source 8 is disposed. On the opposite side of the light conducting plate 7 and light source 8 from the liquid crystal element part 6, the reflector 9 is disposed. The light emitted from the light source 8 which is realized by a linear light source such as cold cathode ray tube is led up to immediately beneath the liquid crystal element part 6 by the light conducting plate 7, and is reflected by the reflector 9 and enters the liquid crystal element part 6.

FIG. 13 is a sectional view showing a constitution of a liquid crystal display device 11 using the back light (c) above. In the liquid crystal display device 11, the back light part 10 is composed of a dispersion type EL element 17 which is a plane light source. The dispersion type EL element 17 is composed by interspacing a light emitting layer 16 between a substrate 12 on which a transparent electrode 14 is formed, and a substrate 13 on which a metal electrode 15 is formed. Of the substrates 12, 13, at least the substrate 12 is light permeable. The light emitting layer 16 is formed by dispersing fluorescent material 16b such as zinc sulfate (ZnS) powder doping copper (Cu) or silver (Ag) in the binder 16a of synthetic resin, low melting glass powder or the like. When a voltage is applied between the transparent electrode 14 and the metal electrode 15, the light emitting layer 16 emits light, and the produced light enters the liquid crystal element part 6 directly and after being reflected by the metal electrode 15.

Such a dispersion type EL element 17 is weak in humidity. Generally, the brightness half-period of dispersion type EL element is 2,000 to 4,000 hours, and the light emission life is short, and when used as the back light, frequent maintenance is required.

Incidentally, reducing the thickness and enhancing the performance are demanded in the display used as a man-machine interface along with the progress of computer, and as one of such measures it is proposed to integrate the liquid crystal display element and back light in the liquid crystal display device. Requirements of the back light for integration with the liquid crystal display element are the homogeneous composition with the liquid crystal display element, plane light source, and long life.

When integrating the back light and liquid crystal display element for reducing the thickness and enhancing the performance, in the back light by using the cold cathode ray tube of (a) or (b), since it is not of the same composition as the liquid crystal display element composed of members possessing light permeability such as glass substrate, it is impossible to reduce the thickness by integrating with the liquid crystal display element. In the back light using the dispersion type EL element (c), although it is possible to reduce the thickness by integrating with the liquid crystal display element, the light emission life is short, and the life of the liquid crystal display device is limited by the life of the back light.

SUMMARY OF THE INVENTION

It is hence a primary object of the invention to present a thin, high performance liquid crystal display device by integrating the liquid crystal display element and light source.

To achieve the object, the invention presents a liquid crystal display device comprising a liquid crystal display element having a liquid crystal layer interposed between a pair of light permeable substrates, and a light source, wherein the light source is formed by sequentially stacking a metal electrode, an insulating layer, a phosphor layer, an insulating layer, and a transparent electrode on a glass substrate, and the glass substrate is bonded to the opposite side surface of the side surface of the liquid crystal layer of either one of the pair of light permeable substrates through an insulation layer.

In the invention, the insulation layer is a silicone resin layer.

Also in the invention, the insulation layer possesses an action of scattering the light entering from the light source.

In the invention, the insulation layer is an oil layer, and the oil layer contains an oil material and a light scattering material differing in the refractive index from the oil material.

In the invention, the light scattering material is composed of plastics, $TiO_2$, $SiO_2$ or $Al_2O_3$.

The invention also presents a liquid crystal display device comprising a liquid crystal display element having a liquid crystal layer interposed between a pair of light permeable substrates, and a light source, wherein the light source formed by sequentially stacking a transparent electrode, an insulating layer, a phosphor layer, an insulating layer, and a metal electrode is disposed in a region other than the display region of the liquid crystal display element, on the surface of the opposite side substrate of the display surface side of the pair of light permeable substrates.

In the invention, surface roughening treatment is processed on the substrate surface on which the light source is provided.

Also in the invention, the light source is covered with a protective layer possessing reflectivity.

In the invention, the light source is disposed on the liquid crystal layer side surface, on the substrate of the opposite side of the display surface side of the pair of light permeable substrates.

In the invention, the light source is disposed on the opposite side surface of the liquid crystal layer side surface, on the substrate of the opposite side of the display surface side on the pair of light permeable substrates.

In the invention, a plurality of light sources of which light emission colors of the phosphor layer are blue, green and red are disposed.

The invention moreover presents a liquid crystal display device comprising a liquid crystal display element having a liquid crystal layer interposed between a pair of light permeable substrates, and a light source, wherein the light source is formed by sequentially stacking a metal electrode, an insulating layer, a phosphor layer, an insulating layer, and a transparent electrode, and the light source is disposed in a region other than display picture element of the liquid crystal display element, on the liquid crystal layer side surface of the display surface side substrate of the pair of light permeable substrates.

In the invention, a reflector is provided on the substrate of the opposite side of the display surface side substrate of the pair of light permeable substrates.

Also in the invention, a reflector is provided on the opposite side surface of the liquid crystal layer side surface, on the substrate of the opposite side of the display surface side substrate of the pair of light permeable substrates.

In the invention, picture element electrode provided on the substrate of the opposite side of the display surface side substrate of the pair of light permeable substrates of the liquid crystal display element is composed of a reflective electrode material.

According to the invention, the liquid crystal display device comprises a liquid crystal display element having a liquid crystal layer interposed between a pair of light permeable substrates, and a light source. The light source is a so-called thin film EL element stacking a metal electrode, an insulating layer, a phosphor layer, an insulating layer, and a transparent electrode sequentially on a glass substrate. The glass substrate is bonded to the opposite side surface of the liquid crystal layer side surface of either one of the pair of light permeable substrates through an insulation layer.

Therefore, by entering the light emitted by applying a voltage between the pair of electrodes of the thin film EL element into the liquid crystal display element controlled, in the orientation of the liquid crystal molecules of the liquid crystal layer, and passing or cutting off the light, the display is realized. Besides, the liquid crystal display element can be integrated with the light source, so that the liquid crystal display device may be further reduced in thickness. Moreover, using the thin film EL element having higher reliability to humidity than the dispersion type EL element, the light emission life of the EL element is extended, and a maintenance-free liquid crystal display device may be realized. Furthermore, when the insulation layer possesses the action for scattering incident light, it is possible to obtain a favorable display quality by reducing the effects of defects by insulation breakdown of the phosphor layer.

Still, according to the invention, the liquid crystal display device comprises a liquid crystal display element having a liquid crystal layer interposed between a pair of light permeable substrates, and a light source. The light source is disposed in a region other than the display region of the liquid crystal display element, on the surface of the opposite side substrate of the display surface side of the pair of light permeable substrates. The light source is composed of a so-called thin film EL element stacking a transparent electrode; an insulating layer, a phosphor layer, an insulating layer, and a metal electrode in this sequence.

Therefore, the liquid crystal display element and light source can be integrated and the liquid crystal display device is reduced in thickness. At the same time, the reliability to humidity is enhanced, and the light emission life of the light source is extended as compared with that of the dispersion type EL element, and moreover since the light source is disposed in the region other than the display region of the liquid crystal display element, the means for enhancing the cooling effect of the light source is easy, and the heat conduction efficiency can be decreased, so that the temperature rise of the liquid crystal layer can be suppressed. In addition, the area for forming the light source can be reduced, and the material for forming the light source is saved, and the manufacturing cost is reduced. Still more, plural light sources of which PHOSPHOR LAYER emission colors are blue, green and red are disposed, and a white light can be obtained by emitting the plural light sources simultaneously, or multi-color display or full-color display may be realized by emitting the light sources sequentially.

Moreover, according to the invention, the liquid crystal display device comprises a liquid crystal display element having a liquid crystal layer interposed between a pair of light permeable substrates, and a light source. The light source is disposed in a pattern in a region other than the picture element region of the liquid crystal display element, on the liquid crystal layer side surface of the display surface side substrate of the pair of light permeable substrates. The light source is composed of a so-called thin film EL element stacking a metal electrode, an insulating layer, a phosphor layer, an insulating layer, and a transparent electrode in this sequence.

Therefore, the liquid crystal display element and light source can be integrated and the liquid crystal display device is reduced in thickness. At the same time, the reliability to humidity is enhanced, and the light emission life of the light source is extended as compared with that of the dispersion type EL element, so that a maintenance-free liquid crystal display device may be realized.

Thus, according to the invention, on the opposite side surface of the liquid crystal layer of either one of the pair of light permeable substrates for composing the liquid crystal display element, the light source comprising the phosphor layer is formed through an insulation layer. Therefore, the liquid crystal display element and light source can be integrated and the liquid crystal display device is reduced in thickness. At the same time, the plane light source is realized, and the life can be extended, so that a maintenance-free liquid crystal display device may be obtained. Moreover, as the insulation layer possesses the light scattering action, effects of defects due to insulation breakdown of the phosphor layer are decreased, and the display quality may be enhanced.

Moreover, according to the invention, the light source containing the phosphor layer is disposed in a region other than the display region of liquid crystal display element, on the substrate surface of the opposite side of the display surface side of the pair of light permeable substrates for composing the liquid crystal display element. Therefore, along with the above effects, the means for enhancing the cooling effect of light source is easy, and the thermal conductivity can be lowered, so that the temperature rise of the liquid crystal can be suppressed. In addition, the area for disposing the light source can be reduced, and the material for forming the light source is saved, and the manufacturing cost is reduced. Still more, plural light sources of which PHOSPHOR LAYER emission colors are blue, green and red are formed, and a white light can be obtained by emitting the plural light sources simultaneously, or multi-color display or full-color display may be realized by emitting the light sources sequentially.

Also in the invention, the light source containing the phosphor layer is disposed in a pattern in a region other than the picture element region, on the liquid crystal layer side surface of the display surface side substrate of the pair of light permeable substrates for composing the liquid crystal display element. Therefore, the same effects as above are obtained.

BRIEF DESCRIPTION OF THE DRAWINGS

Other and further objects, features, and advantages of the invention will be more explicit from the following detailed description taken with reference to the drawings wherein:

FIG. 1 (2) is a sectional view showing the constitution of an EL light source 25 of the same liquid crystal display device 20;

FIG. 3 (1) is a sectional view showing the constitution of a liquid crystal display device 37 in a second embodiment of the invention;

FIG. 3 (2) is a plan view of the liquid crystal display device 37;

FIG. 7 is a block diagram showing an electric configuration of the liquid crystal display device 38;

FIG. 8 (1) to (4) are timing charts showing the driving of lighting driving units 46 to 48 of the liquid crystal display device 38;

FIG. 9 (1) is a sectional view showing the constitution of a liquid crystal display device 39 in a third embodiment of the invention;

FIG. 9 (2) is a plan view of the liquid crystal display device 39;

DETAILED DESCRIPTION OF THE PREFERRED EMBODIMENTS

Figure 1:
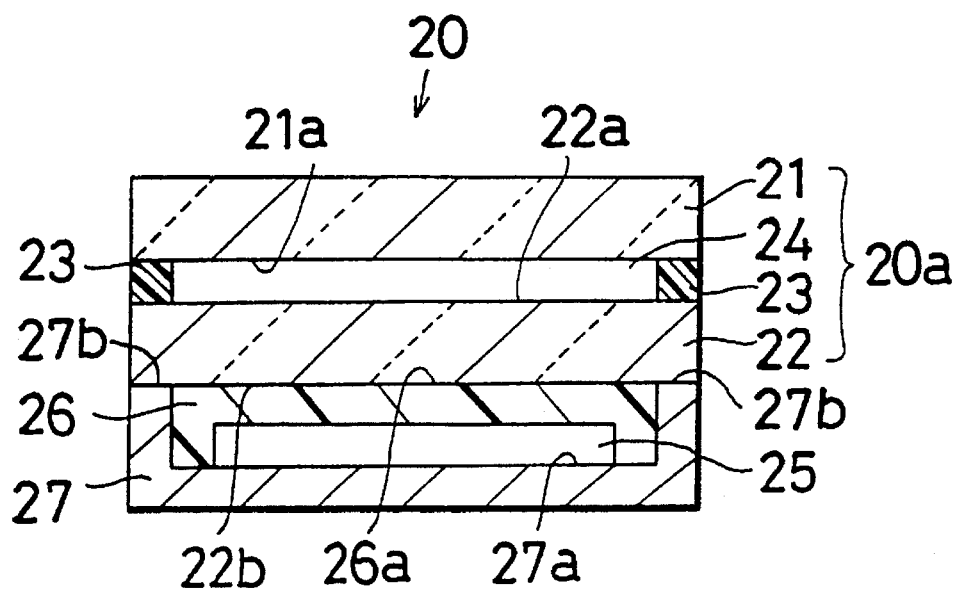
FIG. 1 (1) is a sectional view showing the constitution of a liquid crystal display device 20 in a first embodiment of the invention.
Figure 1:
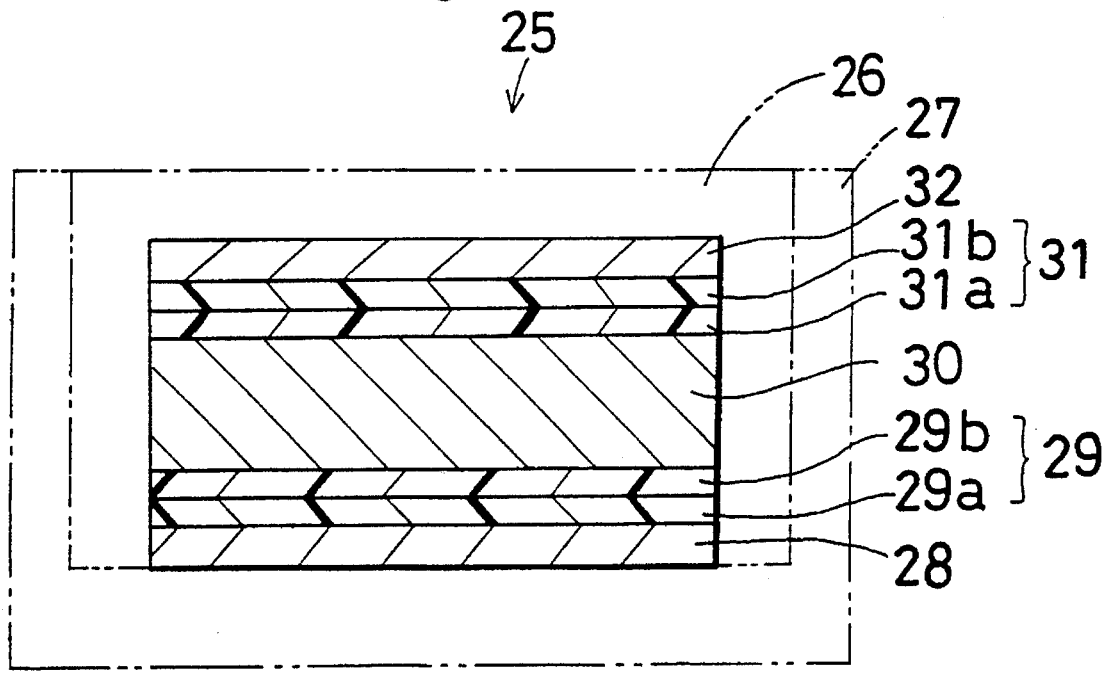

Now referring to the drawing, preferred embodiments of the invention are described below.

FIG. 1 (1) is a sectional view showing the constitution of a liquid crystal display device 20 in a first embodiment of the invention, and FIG. 1 (2) is a sectional view showing the constitution of an EL light source 25 of the same liquid crystal display device 20. The liquid crystal display device 20 comprises a liquid crystal element part 20a composed of substrates 21, 22, an adhesive layer 23, and a liquid crystal layer 24, an EL light source 25, an insulation layer 26, and a glass substrate 27.

The substrates 21, 22 composing the liquid crystal element part 20a are made of light permeable glass or high molecular compound film, and orientation film and transparent electrode, not shown, are formed on one side 21a, 22a of the substrates 21, 22. The adhesive layer 23 is realized, for example, by thermosetting epoxy resin or ultraviolet setting epoxy resin. The liquid crystal layer 24 is realized, for example, by nematic liquid crystal.

The substrates 21, 22 are disposed so that one side 21a of the substrate 21 may be opposite to one side 22a of the substrate 22, and are adhered through the adhesive layer 23. The liquid crystal layer 24 is intervening between the substrate 21 and substrate 22.

The EL light source 25 is a so-called thin film EL element, and is composed as described below. An insulation layer 26 is for preventing insulation breakdown of the EL light source 25, and is realized, for example, by silicone resin of 10 μm in thickness. The EL light source 25 is formed on an inside surface 27a of a box-shaped glass substrate 27, and the insulation layer 26 is formed so as to cover the EL light source 25. Thus, the end portion 27b of side wall of the glass substrate 27 on which the EL light source 25 is disposed, and the surface 26a of the insulation layer 26 are bonded to the other side 22b of the substrate 22.

The EL light source 25 is, as shown in FIG. 1 (2), composed of a first electrode 28, a first insulation layer 29, a phosphor layer 30, a second insulation layer 31, and a second electrode 32. The first electrode 28 is realized by stacking, for example, Mo (molybdenum) and W (tungsten), and is formed on the surface 27a of the glass substrate 27 in a thickness of, for example, 150 nm. The first insulation layer 29 is a two-layer structure comprising $SiO_2$ film 29a and $Si_3N_4$ film 29b, and the $SiO_2$ film 29a is formed on the first electrode 28 in a thickness of 30 to 80 nm, and the $Si_3N_4$ film 29b is formed further thereon in a thickness of 200 to 300 nm.

The phosphor layer 30 is made of ZnS:Mn film doping manganese (Mn) acting as the center of light emission in the zinc sulfide (ZnS) as base metal material, and is formed on the first insulating layer 29 in a thickness of, for example, 800 nm by vacuum deposition or sputtering method.

The second insulation layer 31 is a two-layer structure comprising $Si_3N_4$ film 31a and $Al_2O_3$ film 31b, and the $Si_3N_4$ film 31a is formed on the phosphor layer 30 in a thickness of 100 to 200 nm, and the $Al_2O_3$ film 31b is formed further thereon in a thickness of 30 to 80 nm. The second electrode 32 is realized by ITO (indium tin oxide), and is formed on the second insulation layer 31 in a thickness of, for example, 100 nm.

Thus formed EL light source 25 is less affected by humidity as compared with the conventional dispersion type EL element because the entire surface is covered with the glass substrate 27 and insulation layer 26, so that the brightness half-period may be extended to be more than 20,000 hours.

Figure 2:
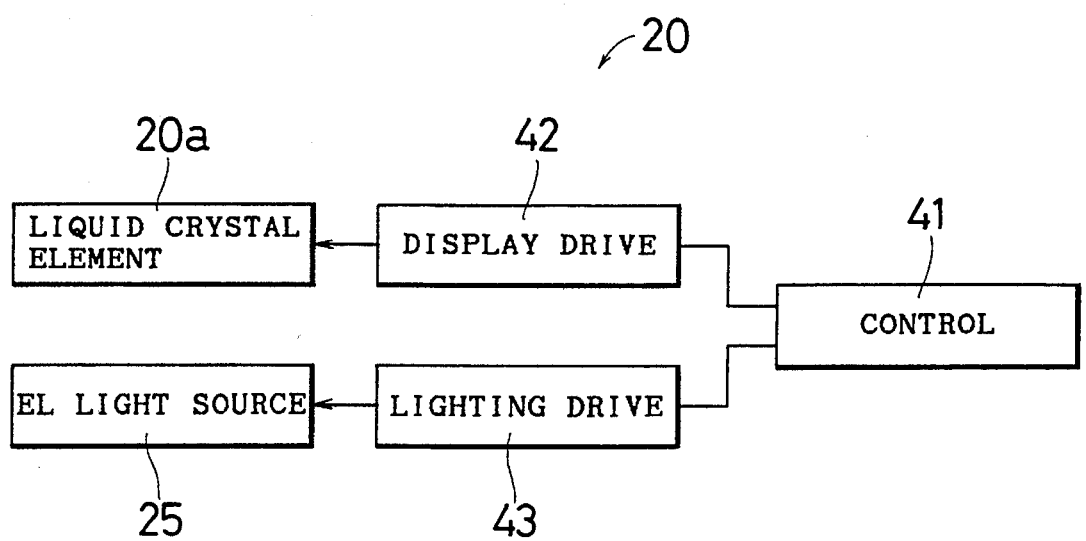
FIG. 2 is a block diagram showing an electric configuration of the liquid crystal display device 20.

FIG. 2 is a block diagram showing an electric configuration of the liquid crystal display device 20. The liquid crystal display device 20 comprises a control unit 41 realized by microprocessor or the like, and a display drive unit 42 and a lighting drive unit 43 are connected to the control unit 41. These drive units 42, 43 are connected with the liquid crystal element part 20a and EL light source 25.

When display is commanded from the control unit 41 to the display drive unit 42 and lighting drive unit 43, the display drive unit 42 drives the liquid crystal element part 20a connected to the drive unit 42. That is, by applying a voltage between the transparent electrodes formed on the substrates 21, 22 of the liquid crystal element part 20a, the orientation state of the liquid crystal molecules of the liquid crystal layer 24 intervening between the substrates 21, 22 is varied, and light passing/cutting is controlled.

On the other hand, the lighting drive unit 43 drives the EL light source 25 connected to the drive unit 43. That is, by applying an alternating-current voltage between the first electrode 28 and second electrode 32 of the EL light source 25, the phosphor layer 30 is illuminated. The manganese (Mn) composing the phosphor layer 30 plays the role of center of light emission in the zinc sulfide (ZnS), and light emission occurs by the transition from the excited state to ground state of the Mn (manganese) excited by the electrons accelerated in the electric field. The light emitted by the phosphor layer 30 enters the liquid crystal element part 20a from the substrate 22 side directly and after being reflected by the surface of the first electrode 28 made of metal. The incident light is controlled in passing or cutting along the orientation of the liquid crystal molecules of the liquid crystal layer 24.

Thus, according to the embodiment, on the other side 22b of the substrate 22 on which the liquid crystal element part 20a is formed, the glass substrate 27a on which the EL light source 25 is formed is bonded through the insulating layer 26, so that the liquid crystal element part 20a and EL light source 24 can be integrated and the liquid crystal display device 20 is reduced in thickness. Besides, since the EL light source 25 is formed of thin film EL element, a plane light source can be formed, and the effect of humidity can be decreased as compared with the conventional dispersion type EL element, and the brightness half-period can be set more than 20,000 hours, and the life of the EL light source 25 can be extended.

In the foregoing embodiment, silicone resin is used as the insulation layer 26 formed on the EL light source 25, but the scope of the invention also includes an example of using oil, instead of silicone resin, and forming the insulation layer 26 as oil layer. The oil is realized, for example, by silicone oil. The non-emission part when the structure of the electrodes 28, 32 of the EL light source 25 is stripe form or dot form, or non-emission defect when insulation breakdown occurs in the phosphor layer 30 may have extremely adverse effects on the display of the liquid crystal element part 20a as dark parts. Such adverse effects may be alleviated by dispersing a light scattering member having a transparent property different in refractive index from the oil material in the oil layer, and scattering the light.

For example, with the refractive index of the oil material to be about 1.5, when plastic balls of which refractive index is about 1 are used as the light scattering member, the light emitted from the phosphor layer 30 is changed in its direction in the interface of the oil layer and plastic balls. On the whole, it changes in various directions, and the directivity of the light is lost. When such insulation layer 26 is used, together with the electrodes 28, 32 having a stripe structure at pitch of 300 μm, if a defect of about 0.3 mm in diameter is formed, the display can be made without deterioration in the display quality. Incidentally, as the light scattering member, not only the material having a lower refractive index than the oil material, but also materials having higher refractive index than the oil material may be used, such as $TiO_2$, $SiO_2$ and $Al_2O_3$ powder.

FIG. 3 (1) is a sectional view showing the constitution of a liquid crystal display device 37 in a second embodiment of the invention, and FIG. 3 (2) is a plan view of the liquid crystal display device 37. In the liquid crystal display device 37 as the second embodiment, the substrate 22 works as light conducting plate, and the EL light source 25 is provided in a place other than the display region 37a. In this embodiment, the display region 37a is the mutually confronting regions of the substrates 21, 22.

The substrate 22 of the opposite side of the display surface side of the pair of light permeable substrates 21, 22 is pretreated on the surface for picking up light, for example, by surface roughening. This treatment is applied at least to one side 22a of the liquid crystal layer side surface of the substrate 22, in the region corresponding to the display region 37a. The surface toughening is realized, for example, by a sand-blast method. The sand-blast method is embodied as follows. The surface of the substrate is covered with a mask made of metal or the like, and abrasives made of $SiO_2$, $TiO_2$ or the like together with air or water are sprayed onto the surface not covered with the mask, and the surface is abraded.

The EL light source 25 is disposed in the region other than the display region 37a shown in FIG. 3 (2) of the treated substrate 22, for example, on one side 22a of the liquid crystal layer 24 side corresponding to the light source region 37b. On the EL light source 25, an insulation layer 26 is formed in a thickness of 10 μm so as to cover the EL light source 25, and moreover a protective layer 33 is formed so as to cover the insulation layer 26 and the other side 22b of the substrate 22. The protective layer 33 is for protecting the EL light source 25, which is realized by, for example, an organic sheet of evaporated aluminum (Al), and it possesses the action of reflecting the light passing through the substrate 22 to enter into the liquid crystal element part.

The EL light source 25 is composed same as in the first embodiment, and the first electrode 28, the first insulation layer 29 ($SiO_2$ film 29a, $Si_3N_4$ film 29b), the phosphor layer 30, the second insulation layer 31 ($Si_3N_4$ film 31a, $Al_2O_3$ film 31b), and the second electrode 32 are formed on one side 22a of the substrate 22. The side 22a of thus formed substrate 22 corresponding to the display region 37a, and one side 21a of the substrate 21 are disposed to confront each other, and are adhered through an adhesive layer 23. The liquid crystal layer 24 is intervening between the substrates 21, 22.

The electric configuration of the liquid crystal display device 37 is same as in the first embodiment, and is shown in FIG. 2. When display is commanded from the control unit 41, the display drive unit 42 drives the liquid crystal element part, and the lighting drive unit 43 drives the EL light source 25. The light generated by applying an alternating-current voltage between the first electrode 28 and second electrode 32 of the EL light source 25 is reflected by the surface of the first electrode 29 made of metal and the surface of the protective layer 33 composed of an organic sheet of evaporated aluminum (Al), and gets into the substrate 22, and further enters the liquid crystal element part while passing through the substrate 22 possessing the function of a light conducting plate. The incident light is controlled by passing or cutting depending on the orientation of the liquid crystal molecules of the liquid crystal layer 24, thereby executing the display.

Thus, according to the embodiment, since the EL light source 25 is disposed in the region other than the display region 37a of the substrate 22 and the light is passed through the substrate 22 to enter the liquid crystal element part, the same effects as in the first embodiment are obtained, and moreover since the EL light source 25 is not disposed immediately beneath the liquid crystal element part, the means for enhancing the cooling effect of the EL light source 25 is easy, and the thermal conduction efficiency can be decreased, so that the temperature rise of the liquid crystal layer 24 may be suppressed. At the same time, the area for forming the EL light source 25 can be reduced, and the materials for the light source 25 are saved, and the manufacturing cost is lowered.

Figure 4:
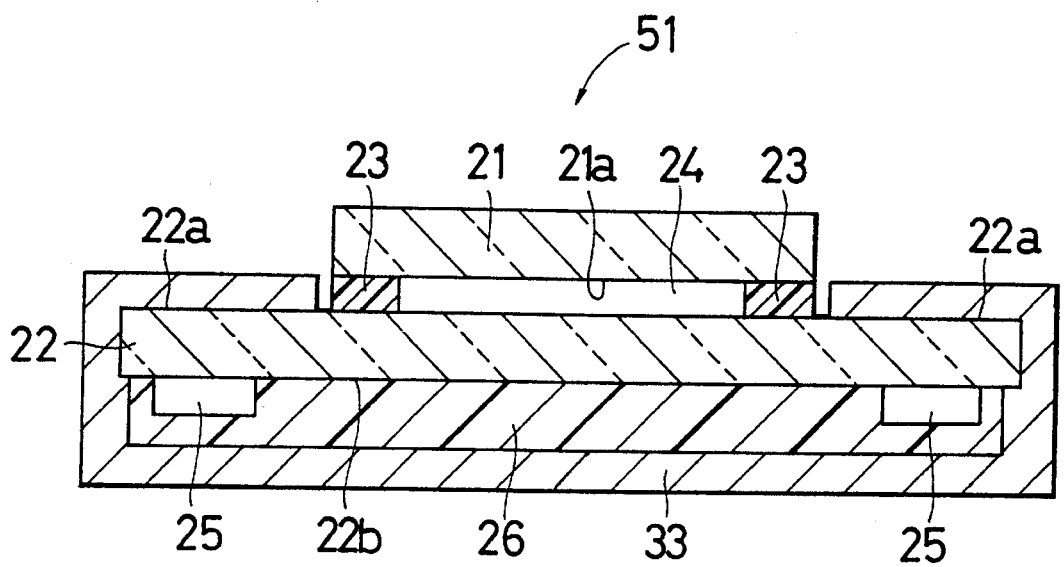
FIG. 4 is a sectional view showing the constitution of a liquid crystal display device 51 in other example of the second embodiment of the invention.
Figure 5:
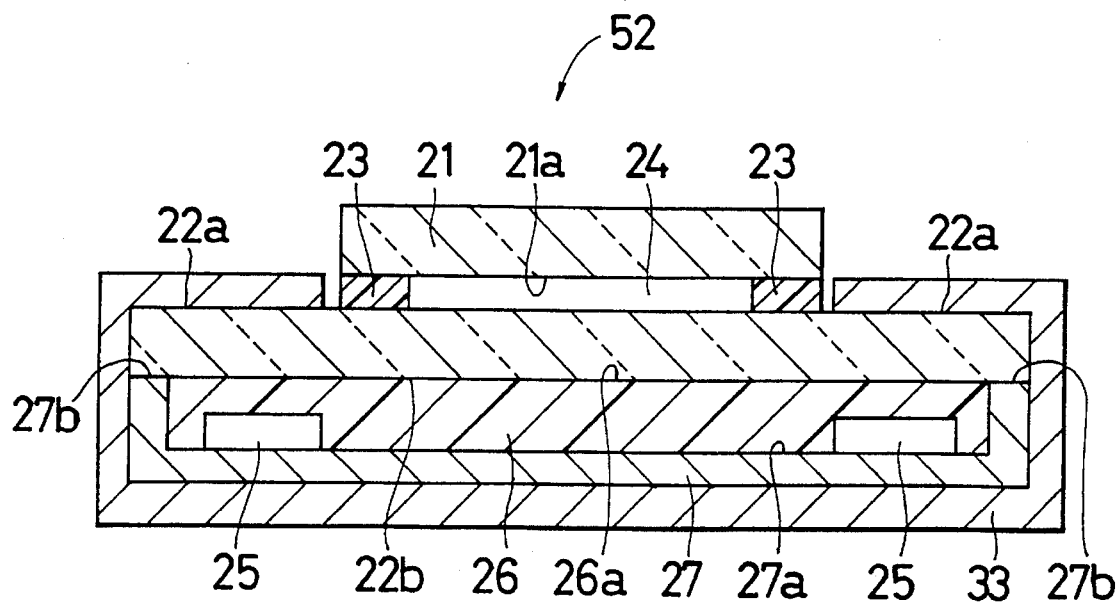
FIG. 5 is a sectional view showing the constitution of a liquid crystal display device 52 in another example of the second embodiment of the invention.

In the above embodiment, the EL light source 25 is provided on one side 22a others than the display region 37a of the substrate 22, but as shown in FIG. 4, the scope of the invention also includes an example of forming the EL light source 25 on the other side 22b. In addition as in the first embodiment, as shown in FIG. 5, the scope of the invention also includes bonding a substrate 27 on which the EL light source 25 is disposed to the substrate 22 and further forming a protective layer 33.

Figure 6:
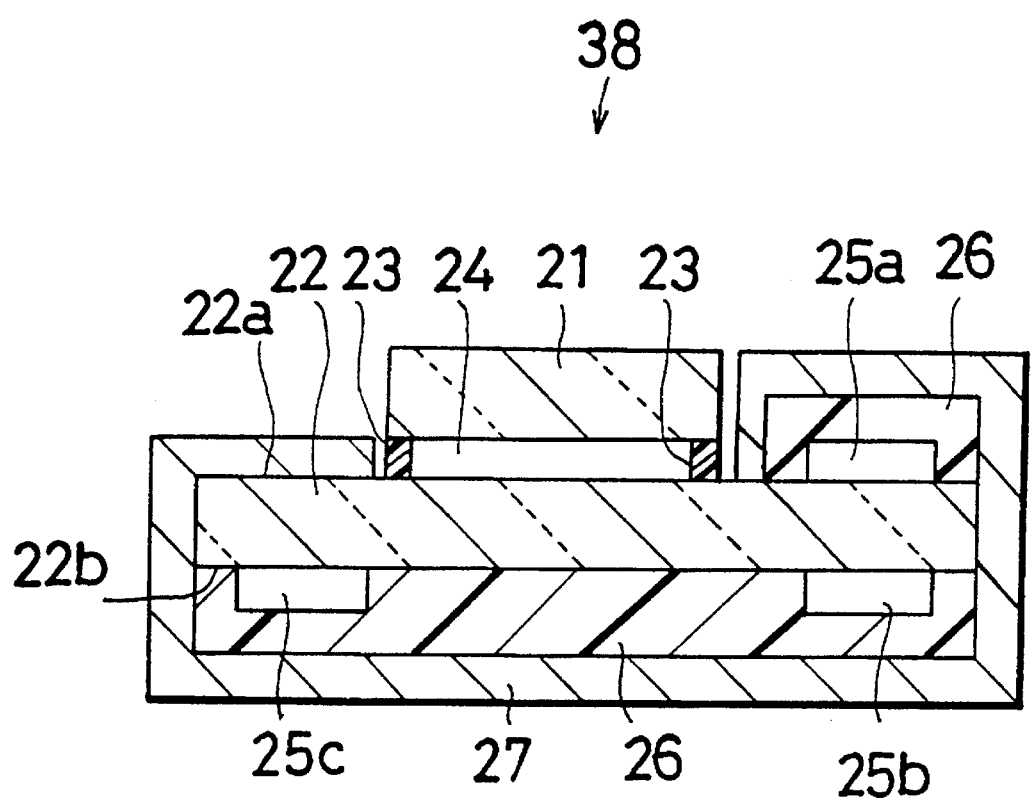
FIG. 6 is a sectional view showing the constitution of a liquid crystal display device 38 in a different example of the second embodiment of the invention.

Moreover, the liquid crystal display device 37 is an example of using ZnS:Mn film as the phosphor layer 30 of the EL light source 25, but as in the case of the liquid crystal display device 38 shown in FIG. 6, the scope of the invention also includes a case in which plural EL light sources 25a to 25c are disposed on one side 22a and other side 22b of the substrate 22, and the phosphor layers of the EL light sources 25a to 25c are respectively made of, for example, ZnS:thulium (Tm), ZnS:terbium (Tb), and ZnS:europium (Eu) to form three primaries of blue (B), green (G) and red (R).

FIG. 7 is a block diagram showing an electric configuration of the liquid crystal display device 38. The liquid crystal display device 38 comprises a control unit 44 realized by microprocessor or the like, and the control unit 44 is connected with a display drive unit 45 and lighting drive units 46 to 48. These drive units 45 to 48 are connected with liquid crystal element 38a and EL light sources 25a to 25c.

When display is commanded from the control unit 44, the display drive unit 45 drives the liquid crystal element 38a, and controls the orientation of the liquid crystal molecules of the liquid crystal layer 24. The lighting drive unit 46 drives the EL light source 25a, the lighting drive unit 47 does the EL light source 25b, and the lighting drive unit 48 does the EL light source 25c, at the individual timing.

FIG. 8 is a timing chart showing driving of the lighting drive units 46 to 48. As shown in FIG. 8 (2), when the lighting drive unit 46 drives the EL light source 25a, blue light is emitted, and the liquid crystal element 38a shows a blue screen, and successively as shown in FIG. 8 (3), when the lighting drive unit 47 drives the EL light source 25b, a green light is emitted, and the liquid crystal element 38a becomes a green screen. Further, as shown in FIG. 8 (4), when the lighting drive unit 48 drives the EL light source 25c, a red light is emitted, and the liquid crystal element 38a becomes a red screen. The light from the EL light sources 25a to 25c enters the liquid crystal element 38a. The incident light is controlled by passing or cutting depending on the orientation of liquid crystal molecules of the liquid crystal layer 24, thereby executing the display.

Thus realized liquid crystal display device 38 is capable of obtaining a white light by emitting all light sources 25a to 25c simultaneously, or displaying any desired one of three colors by selectively illuminating the light sources 25a to 25c. Furthermore, in combination with filterless liquid crystal display device, the light sources 25a to 25c may be momentarily illuminated in time series to make multi-color display or full-color display.

FIG. 9 (1) is a sectional view showing the constitution of a liquid crystal display device 39 in a third embodiment of the invention, and FIG. 9 (2) is a plan view of the liquid crystal display device 39. In the liquid crystal display device 39 of this embodiment, a patterned EL light source 25 is disposed on one side 21a of the substrate 21. That is, the EL light source 25 is disposed in an area other than a display picture element 39a shown in FIG. 9 (2), on one side 21a of the liquid crystal layer 24 side of the substrate 21 at the display surface side of the liquid crystal display device 39, or in a region corresponding to a light source region 39b. The EL light source 25 is composed the same as in the foregoing first embodiment, and the first electrode 28, the first insulation layer 29 ($SiO_2$ film 29a, $Si_3N_4$ film 29b), the phosphor layer 30, the second insulation layer 31 ($Si_3N_4$ film 31a, $Al_2O_3$ film 31b), and the second electrode 32 are formed sequentially. The substrate 21 on which the EL light source 25 is patterned and formed is adhered to the substrate 22 with the adhesive layer 23. The liquid crystal layer 24 is intervening between the substrates 21 and 22.

The light generated by applying an alternating-current voltage between the first electrode 28 and second electrode 32 of the EL light source 25 passes through the liquid crystal layer 24 directly and after being reflected by the surface of the first electrode 28 made of metal or the like, and is reflected by the electrode or reflector formed on, for example, the substrate 22 side, and is emitted from the substrate 21 side. At this time, the light is controlled by passing or cutting depending on the orientation of liquid crystal molecules of the liquid crystal layer 24, thereby executing the display.

Figure 10:
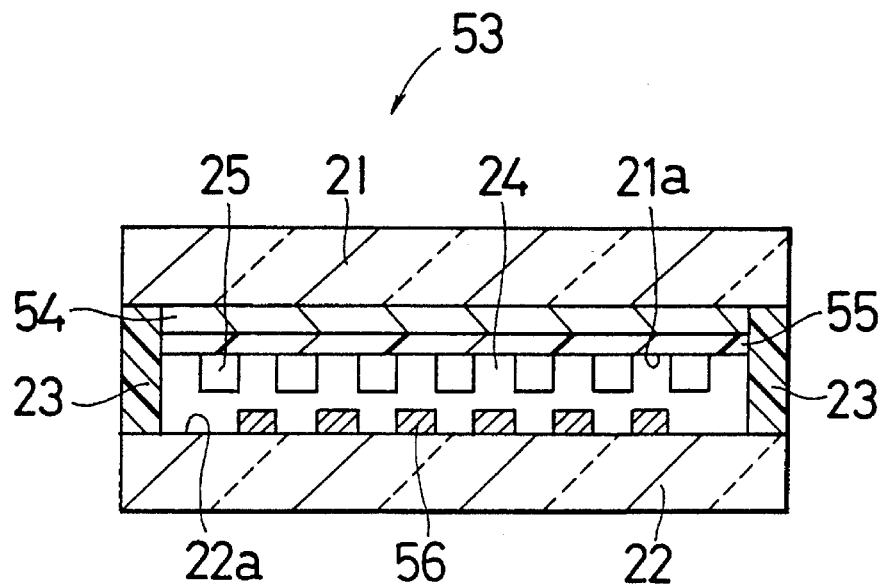
FIG. 10 is a sectional view showing the constitution of a liquid crystal display device 53 in other example of the third embodiment of the invention.

FIG. 10 is a sectional view showing an other example of the third embodiment. In the liquid crystal display device 53 shown in FIG. 10, on one side 21a of the liquid crystal layer side of the substrate 21, a transparent electrode 54 made of, for example, ITO is formed on the entire surface, an insulation layer 55 realized by a synthetic resin possessing insulating property or the like is formed on the electrode 54, and the patterned EL light source 25 is formed on the insulation layer 55. On one side 22a of the liquid crystal layer side of the confronting substrate 22, picture element electrodes 56 corresponding to plural picture elements are formed. The picture element electrodes 56 are made of reflective material, for example, aluminum (Al). Accordingly, the light generated in the EL light source 25 is reflected by the picture element electrodes 56, and is emitted from the substrate 21 side. On one side 22a of the substrate 22, there are TFT element and MIM element, for example, aside from the picture element electrodes 56, and the liquid crystal display device 53 is driven in active matrix.

Figure 11:
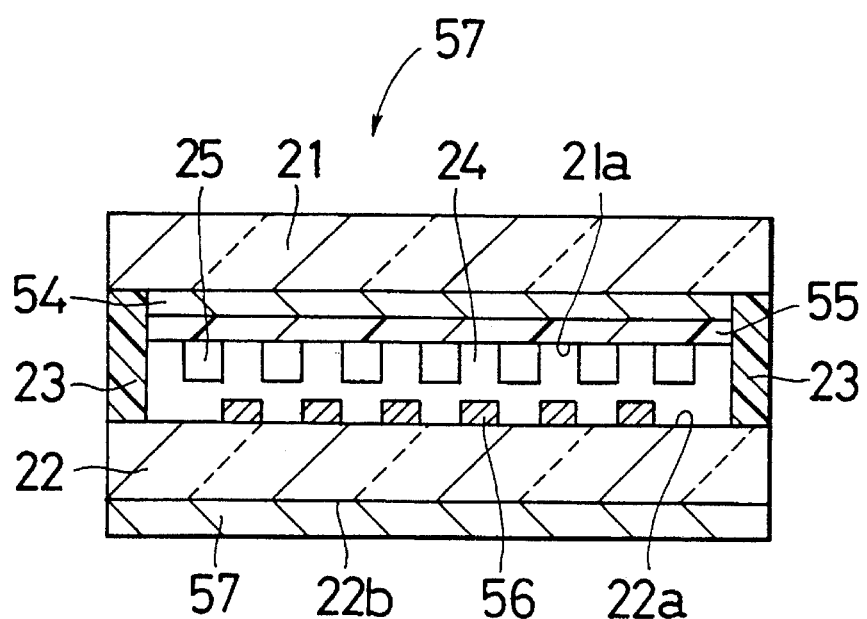
FIG. 11 is a sectional view showing the constitution of a liquid crystal display device 57 in another example of the third embodiment of the invention.
Figure 12:
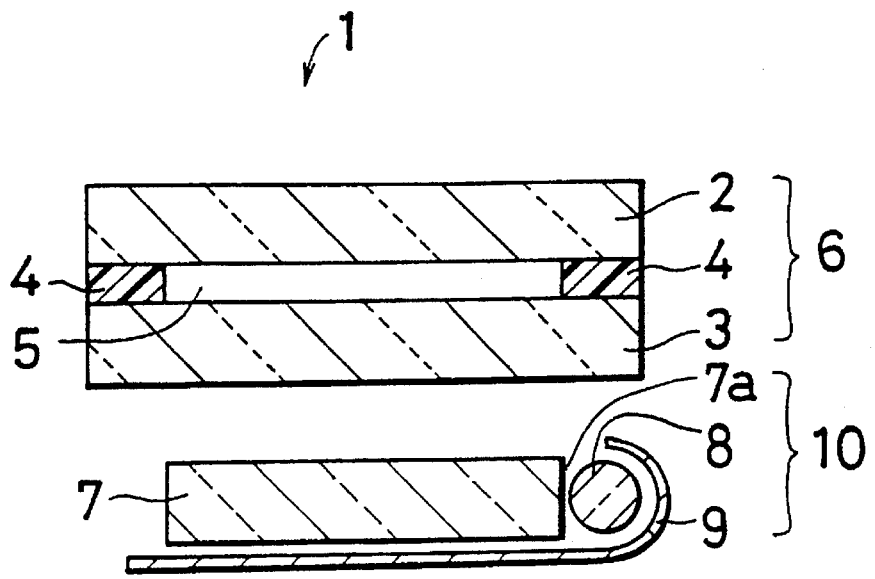
FIG. 12 is a sectional view showing the constitution of a conventional liquid crystal display device 1.
Figure 13:
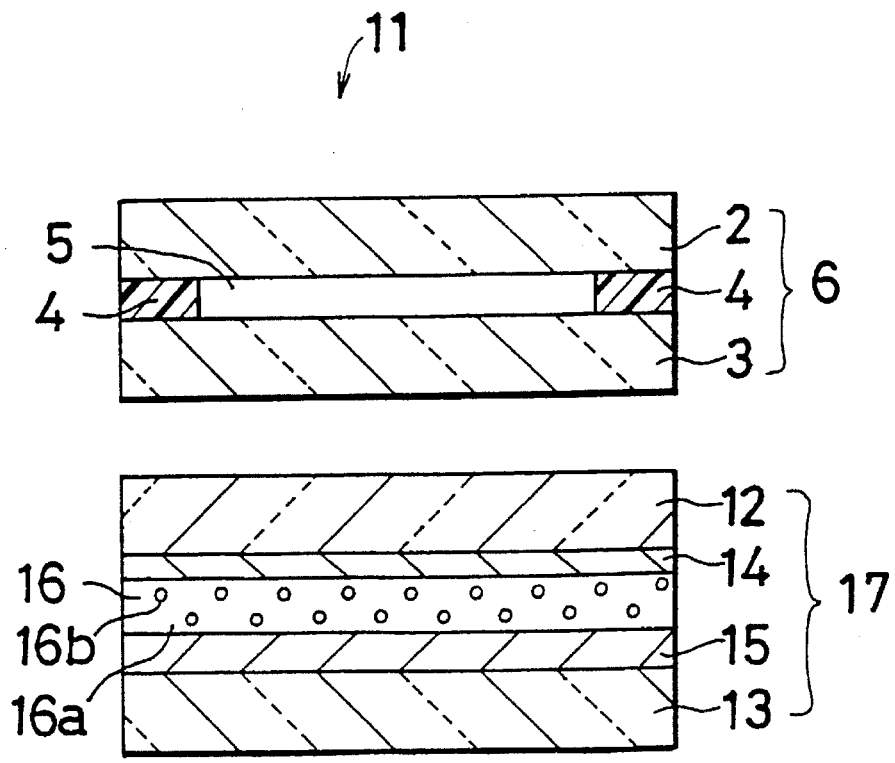
FIG. 13 is a sectional view showing the constitution of a conventional liquid crystal display device 11.

FIG. 11 is a sectional view showing another example of the third embodiment. The liquid crystal display device 57 shown in FIG. 11 is composed nearly the same as the liquid crystal display device 53, except that a reflector 57 realized, for example, by Al plate or Al evaporation plate is provided on the other side 22b of the opposite side of the liquid crystal layer side surface 22a of the substrate 22. Accordingly, the light generated in the EL light source 25 is reflected by the reflector 57, and is emitted from the substrate 21 side. The picture element electrodes 56 may be formed either by using reflective electrode material as mentioned above, or by using non-reflecting transparent electrode material such as ITO.

Thus, according to the third embodiment, since the EL light source 25 is patterned and formed on one side 21a of the substrate 21, the same effects as in the first embodiment are obtained.

In the foregoing first to third embodiments, ZnS:Mn film was used as the phosphor layer 30, and only one layer of PHOSPHOR LAYER 30 was formed, but the phosphor layer 30 is not limited to this constitution alone, and it may be made of various materials, such as white light emitting material mainly composed of strontium sulfide (SrS):cerium (Ce), and color materials including ZnS:Mn, ZnS:terbium (Tb), calcium sulfide (CaS):europium (Eu), and ZnS:thulium (Tm), and the scope of the invention also includes examples of stacking these PHOSPHOR LAYER materials or putting them side by side.

The scope of the invention also includes an example of forming the phosphor layer 30 of the EL light source 25 by using ZnS:Mn film to emit yellow color in a wide band, and installing red and green filters in the liquid crystal element part to display red, yellow and green colors. The scope of the invention moreover includes an example of forming the phosphor layer 30 of the EL light source 25 by using SrS:Ce film to emit blue and green colors, and combining with the light emitting material film having Mn, Sm and Eu mainly in the center of light emission to display in white color emission.

The invention may be embodied in other specific forms without departing form the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A liquid crystal display device comprising a liquid crystal display element having a liquid crystal layer interposed between a pair of light permeable substrates, and a light source, wherein the light source is comprised of sequential layers comprising a metal electrode, an insulating film, a phosphor layer, an insulating film, and a transparent electrode stacked on a glass member, an insulation layer covering the transparent electrode, said insulation layer comprising an oil layer containing an oil material and a light scattering material differing in the refractive index from the oil material, wherein the insulation layer possesses an action of scattering the light entering from the light source, and the said glass member is bonded to the side surface of the substrate opposite the side surface adjacent the liquid crystal layer of either one of the pair of light permeable substrates.

2. The liquid crystal display device of claim 1, wherein the light scattering material is composed of plastics, $TiO_2$, $SiO_2$ or $Al_2O_3$.

3. A liquid crystal display device comprising a liquid crystal display element having a liquid crystal layer interposed between a pair of light permeable substrates, and a light source, wherein the light source is comprised of sequential layers comprising a transparent electrode, an insulating film, a phosphor layer, an insulating film, and a metal electrode disposed in a region other than the display region of the liquid crystal display element on the surface of one of the pair of light permeable substrates that is opposite the other substrate providing a display surface.

4. The liquid crystal display device of claim 3, wherein surface toughening treatment is processed on the substrate surface on which the light source is.

5. The liquid crystal display device of claim 3, wherein the light source is covered with a protective layer possessing reflectivity.

6. The liquid crystal display device of claim 3, wherein the light source is disposed on the liquid crystal layer side surface of the said one substrate of the pair of light permeable substrates.

7. The liquid crystal display device of claim 3, wherein the light source is disposed on the side surface opposite the liquid crystal layer side surface of the said one substrate of the pair of light permeable substrates.

8. The liquid crystal display device of claim 3, wherein a plurality of light sources of which light emission colors of the phosphor layer are blue, green and red are disposed on the said one substrate.

9. A liquid crystal display device comprising a liquid crystal display element having a liquid crystal layer interposed between a pair of light permeable substrates, one of which is a display substrate, and a light source, wherein the light source is formed by sequential layers comprising a metal electrode, an insulating film, a phosphor layer, an insulating film, and a transparent electrode, and the light source is disposed in a region other than a display picture element of the liquid crystal display element and on the surface of the display substrate facing the liquid crystal layer of the pair of light permeable substrates.

10. The liquid crystal display device of claim 9, wherein a reflector is provided on a surface of the substrate opposite the display substrate of the pair of light permeable substrates.

11. The liquid crystal display device of claim 9, wherein a reflector is provided on the liquid crystal layer facing side surface of the substrate opposite the display substrate of the pair of light permeable substrates.

12. The liquid crystal display device of claim 9, wherein a picture element electrode is provided on the surface of the substrate opposite the display substrate of the pair of light permeable substrates of the liquid crystal display element and composed of a reflective electrode material.

* * * * *